United States Patent [19]

Grill

[11] Patent Number: 5,000,276
[45] Date of Patent: Mar. 19, 1991

[54] SYSTEM FOR CONSTRUCTING NOVELTY IMPULSE MACHINES INCLUDING A WEIGHT SCALE

[76] Inventor: Simon Grill, 24242 Hatteras St., Woodland Hills, Calif. 91367

[21] Appl. No.: 493,765

[22] Filed: Mar. 15, 1990

[51] Int. Cl.⁵ .................... G01G 21/28; G01G 23/00; A63F 9/18
[52] U.S. Cl. .................................. 177/241; 177/245; 273/1 E; 273/161
[58] Field of Search ................................ 177/238–243, 177/245; 273/1 E, 161

[56] References Cited

U.S. PATENT DOCUMENTS

| | | | |
|---|---|---|---|
| 1,596,867 | 8/1926 | Brunaugh | 273/161 X |
| 1,618,616 | 2/1927 | Watling, I | 273/161 |
| 1,785,848 | 12/1930 | Watling, II | 273/161 X |
| 1,923,287 | 8/1933 | Watling, III | 273/161 X |
| 1,947,814 | 2/1934 | Turner et al. | 273/161 X |
| 2,124,838 | 7/1938 | Watling | 273/161 |
| 2,222,364 | 11/1940 | Dillon, Jr. et al. | 273/161 |
| 2,836,980 | 6/1958 | Giepen . | |
| 4,529,207 | 7/1985 | Iseki et al. . | |
| 4,586,575 | 5/1986 | Muerdter et al. . | |
| 4,869,500 | 9/1989 | Williams | 273/1 E |

Primary Examiner—George H. Miller, Jr.
Attorney, Agent, or Firm—Kelly, Bauersfeld & Lowry

[57] ABSTRACT

A modular construction system is provided for building impulse machines having a computer weight module that is responsive to a floor scale assembly. The weight module is supported on a pedestal which is attached to a base plate of the floor scale assembly. The pedestal is hollow to accommodate an electrical cable connecting the impulse module to load sensing means located within a pressure pad of the floor scale assembly. Additional impulse modules having different themes can be attached atop the pedestal along with the weight module by use of an adapter plate. Thereafter, the type of impulse modules utilized in the impulse machine can be changed by detaching selected impulse modules from the adapter plate and substituting new impulse modules therefor. Moreover, a different number of impulse modules can be supported on the pedestal by interchanging the adapter plate with another, differently sized adapter plate designed to accommodate a larger or smaller number of modules thereon.

18 Claims, 2 Drawing Sheets

SYSTEM FOR CONSTRUCTING NOVELTY IMPULSE MACHINES INCLUDING A WEIGHT SCALE

BACKGROUND OF THE INVENTION

This invention relates generally to novelty impulse-type game machines and modular construction systems for such machines. More particularly, this invention relates to a modular construction system for novelty impulse machines including a weight scale and one or more impulse game modules.

Novelty impulse machines are generally vending machines characterized by an impulse module which provides a readout of a user's heart rate, stress level, etc., in response to conditions measured by a sensor held or touched by the user. The readout is indicated by light-emitting diodes or a liquid crystal display screen. Impulse machines are commonly designed to provide entertaining information about the user's future, kissing ability, sex appeal, or the like. The impulse machine may also include a weight scale to provide a body weight readout.

Novelty impulse machines provide an entertaining and informative alternative to conventional arcade game vending machines. Prior methods of constructing impulse machines, however, result in a machine assembly which is limited to use of the same, single impulse module that was originally installed during construction of the impulse machine. In general, provisions are not made to accommodate interchangeability of impulse modules to be utilized in the machine, or for converting a single module impulse machine into a multi-module impulse machine. Moreover, past construction methods generally do not provide for the creation of an impulse machine utilizing several impulse modules, one of which is responsive to a floor scale assembly.

There exists, therefore, a need for an improved modular construction system for building novelty impulse machines of various configurations, wherein a manufacturer may change the type and number of impulse modules utilized while maintaining assembly line continuity and efficiency. Additionally, such an improved modular construction system is needed which enables the manufacturer to build impulse machines having at least one impulse module which cooperates with load sensing means to function as a weight scale. The present invention fulfills these needs and provides further related advantages.

SUMMARY OF THE INVENTION

In accordance with the invention, an improved modular construction system is provided for assembling novelty impulse machines having a weight scale and one or more impulse modules in a manner allowing the number and type of impulse modules to be changed in a relatively simple fashion. Impulse machines manufactured in accordance with the improved system generally comprise a pedestal having a floor scale assembly attached to a bottom end thereof, and at least one impulse module connected to a top end of the pedestal. Two or more impulse modules can be utilized atop the pedestal with the inclusion of an adapter plate. The adapter plate can be interchanged with other differently sized adapter plates in order to accommodate varying numbers of impulse modules.

The present invention advantageously provides means whereby a weight scale and an impulse module responsive thereto can be used in combination with other impulse modules having different themes. This allows for the construction of an impulse machine having a plurality of impulse attractions, thereby increasing the likelihood that the machine will present at least one impulse module that will appeal to a consumer. Moreover, the improved modular construction system permits easy interchangeability of the impulse modules utilized in conjunction with the weight scale impulse module. Yet another advantage of the improved modular construction system is that it allows an impulse machine to be expanded by providing means whereby more impulse modules may be added to an existing unit.

In a preferred form of the invention, a hollow, rectangular pedestal is bolted atop a floor scale assembly including a floor scale having a pressure pad and at least one load cell. Next, a weight scale impulse module is bolted atop the pedestal. The weight scale impulse module is responsive to the floor scale by an electrical cable that connects to the load cell at one end and extends upwardly through the hollow interior of the pedestal to the weight scale impulse module at its opposite end. When other impulse modules are to be included in addition to the weight scale impulse module, an adapter plate is installed between the pedestal and all of the modules. Impulse modules are then bolted to the adapter.

In the event that a single weight scale impulse module has already been attached atop the pedestal and it is desirable to add other types of impulse modules to the unit, the weight scale impulse module is removed and the adapter plate is installed. The number of impulse modules which can be accommodated atop the pedestal is relatively easily changed by simply replacing the adapter plate with another of a different size.

Other features and advantages of the present invention will become apparent from the following more detailed description taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 6:
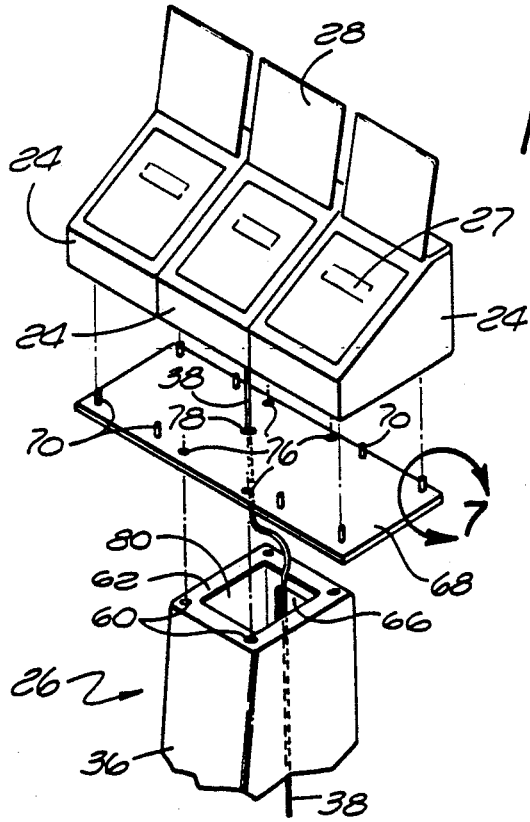
FIG. 6 is a fragmented, exploded view similar to FIG. 2, illustrating an adapter plate upon which three impulse modules are supported atop the pedestal.

As shown in the drawings for purposes of illustration, the present invention relates to a modular construction system for building impulse machines 20 including a floor scale assembly 22. The present invention advantageously enables an impulse machine 20 of the single impulse module type shown in FIG. 1, to be expanded to a multi-module impulse machine 26 (FIG. 6) in a relatively easy fashion. The modular construction system provides means whereby one or more impulse modules 24 may be used in addition to a weight scale module, and wherein the type and number of impulse modules can be changed.

The present invention beneficially provides versatility in an impulse machine so that impulse modules 24 can be added or interchanged, thereby continually allowing the attraction of the impulse machine to be renewed or broadened by enabling the manufacturer to add popular new impulse modules and replace well-used impulse modules of fading appeal. The impulse machine 20 can thus be periodically updated in view of how well each different impulse module theme captures the public's imagination in a particular display location. Advantageously, appeal to a wide range of people is achieved because the modular construction system preferably always incorporates one of the most popular of all impulse modules, namely a computer weight scale version, in addition to which other, differently themed impulse modules may be included. The overall impulse machine, particularly in a multi-module configuration, provides an attractive alternative to conventional arcade game vending machines.

Impulse machines are generally well known in the field of vending machines. The primary component is an impulse module which provides entertaining information concerning one's sex appeal, future, etc., or revealing medical information regarding one's heart rate or stress level. In general, the impulse module becomes functional upon the insertion of a token or coin and uses a liquid crystal display screen 27 or light-emitting diodes to display a readout based upon conditions sensed by a hand sensor or pressure pad. Conventionally, the impulse module utilizes an eye-catching sign 28 to advertise its theme.

In accordance with the present invention, an improved construction system is provided for building impulse machines 20 which include an impulse module 24 that is responsive to a floor scale assembly 22. The impulse module 24 is equipped with a microprocessor 29 and calibration potentiometers 30 (FIG. 3) to enable the impulse module 24 to serve as a computer weight scale which receives input from at least one load cell (not shown) located within a pressure pad 32 of the floor scale assembly 22. The inner workings of the weight scale impulse module are not detailed herein because this information is known to those skilled in the art and does not constitute an inventive feature of this invention. A nine volt battery 34 provides a power source for the impulse module 24.

Figure 1:
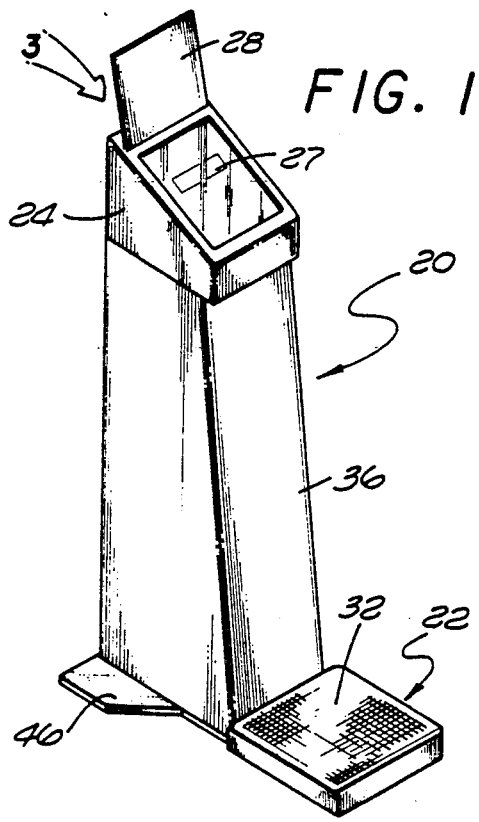
FIG. 1 is a perspective view of a novelty impulse machine constructed in accordance with the modular construction system embodying the invention.
Figure 2:
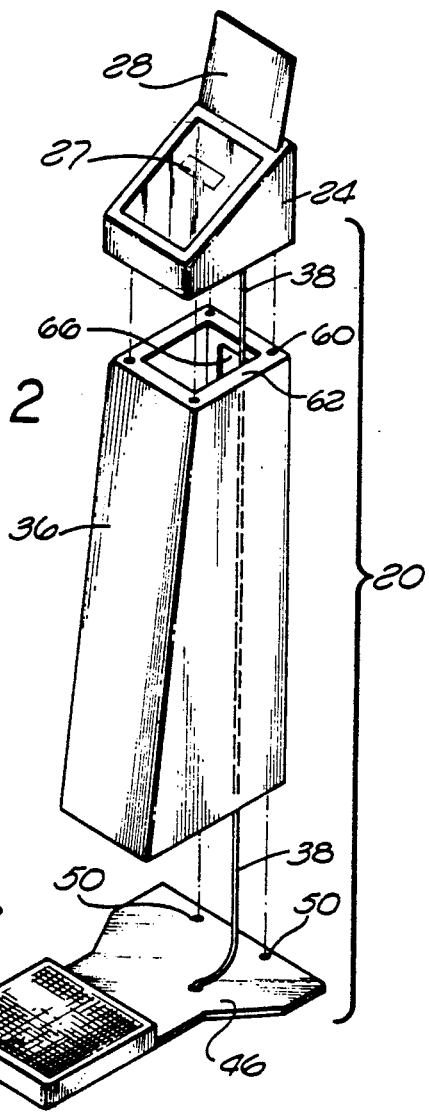
FIG. 2 is an exploded perspective view of the impulse machine of FIG. 1, illustrating several primary components of the impulse machine, including an impulse module, a pedestal and a floor scale assembly.

A supporting structure for the impulse module 24 is provided by metal cabinet means such as a rectangular pedestal 36 illustrated in FIGS. 1 and 2. The pedestal 36 is hollow to accommodate an electrical cable 38 connecting the impulse module 24 to the load cell contained within the floor scale assembly 22. This cable 38 enables the impulse module 24 to be responsive to force exerted upon the pressure pad 32. As viewed in FIG. 4, the upper end of the cable 38 terminates in a plug 40 which engages a socket 42 located on the underside of the impulse module 24. Within the impulse module 24, a similar plug 44 (see FIG. 3) engages the socket 42 to complete an electrical connection between the impulse modules circuitry and load sensing means within the pressure pad 32.

Figure 5:
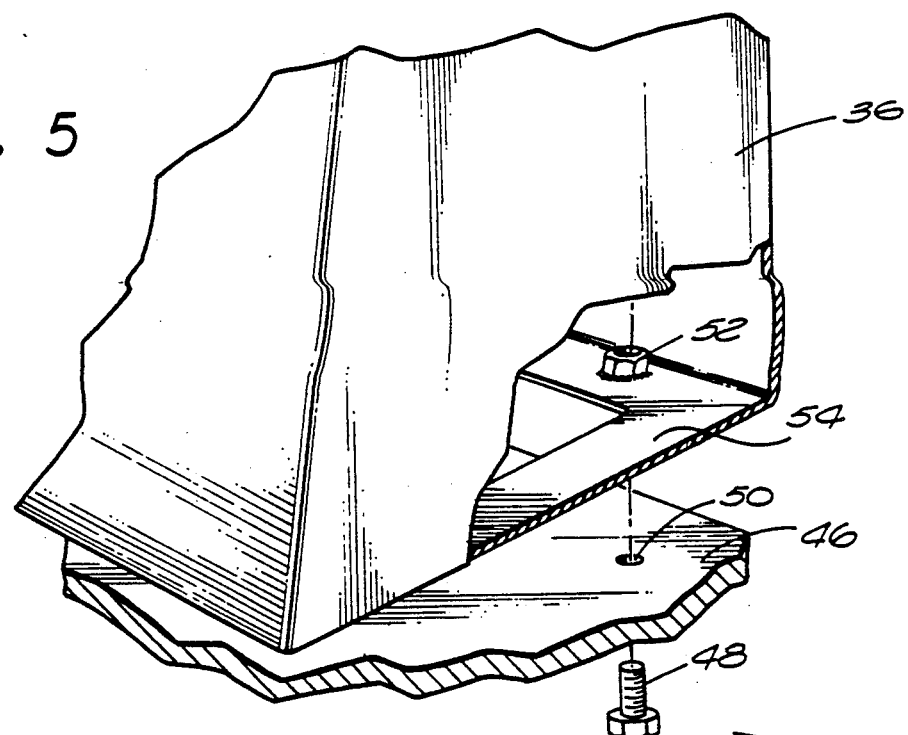
FIG. 5 is an enlarged, fragmented perspective view, partly in cut-away section, illustrating the manner in which the pedestal is attached to the floor scale assembly using a nut welded to an inside flange of the pedestal and a bolt extending upwardly through the floor scale assembly.

In constructing an impulse machine 20 having a single computer scale impulse module 24, such as the unit depicted in FIG. 1, the initial step is attachment of the pedestal 36 to the floor scale assembly 22. The pedestal 36 is situated atop a base plate 46 and is bolted thereto. Referring now to FIG. 5, this step is accomplished using two or more bolts 48 which extend upwardly through apertures 50 in the base plate 46. The bolts 48 protrude through apertures (not visible) in a bottom inside flange 54 of the pedestal 36, and thread into nuts 52 that have been pre-welded onto the flange 54.

Figure 3:
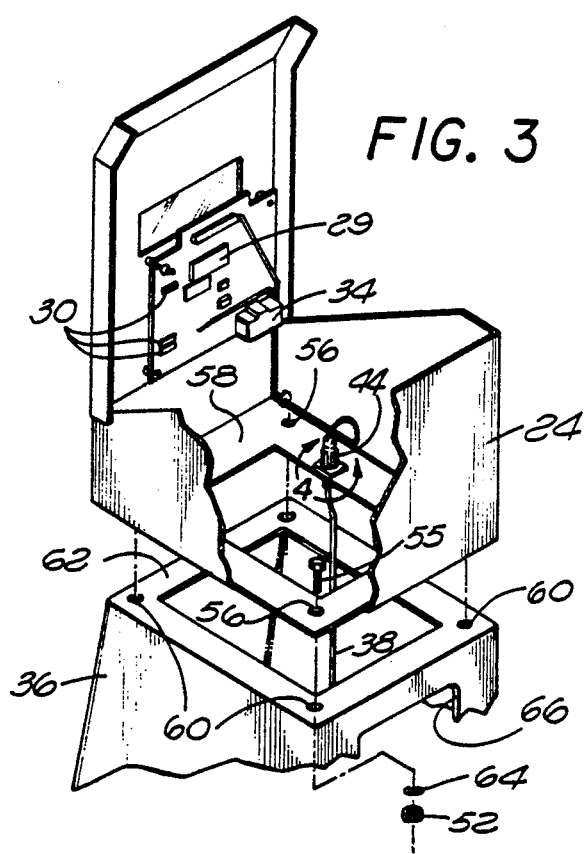
FIG. 3 is an enlarged, fragmented, rear perspective view taken generally in the direction of arrow 3 in FIG. 1, illustrating the impulse module opened to expose its inner components, and also showing the manner in which a single impulse module is attached to the pedestal.
Figure 4:
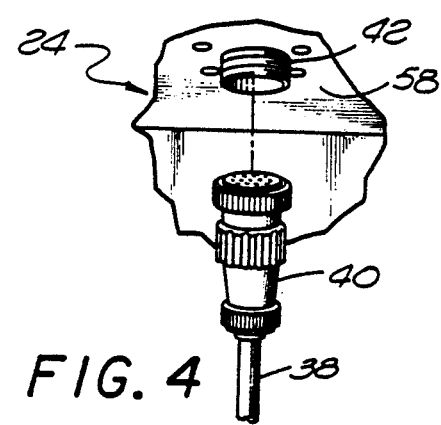
FIG. 4 is a fragmented perspective view of the area indicated by the arrow 4 in FIG. 3, illustrating an upper end of a cable connecting the floor scale assembly to the impulse module.

As illustrated in FIG. 3, the impulse module 24 is attached to the pedestal 36 using bolts 55 that extend downwardly through apertures 56 located in each corner of the bottom 58 of the impulse module 24. The bolts 55 protrude through apertures 60 located in each corner of a top lip portion 62 of the pedestal 36, and are secured with nuts 52. Washers 64 are utilized between each nut 52 and the underside of the module's bottom 58. The pedestal 36 has a rear access opening 66 which permits tightening of the nuts 52 in place and facilitates connection of the plug 40 into the socket 42.

The modular construction system of the present invention advantageously enables an impulse machine 20 (FIG. 1) having a single impulse module 24 to be converted into a multi-module impulse machine 26 (FIG. 6) in a relatively easy fashion. Alternatively, the construction system can initially be used to build a multi-module impulse machine. In the former case, the conversion of an impulse machine 20 into a multi-module impulse machine 26 begins with removal of the impulse module 24 from the pedestal 36, thereby exposing the top lip portion 62 of the pedestal for attachment of an adapter plate 68 thereto. In the latter case, the top lip portion 62 will already be available to receive the adapter plate 68 following attachment of the pedestal 36 to the base plate 46.

Figure 7:
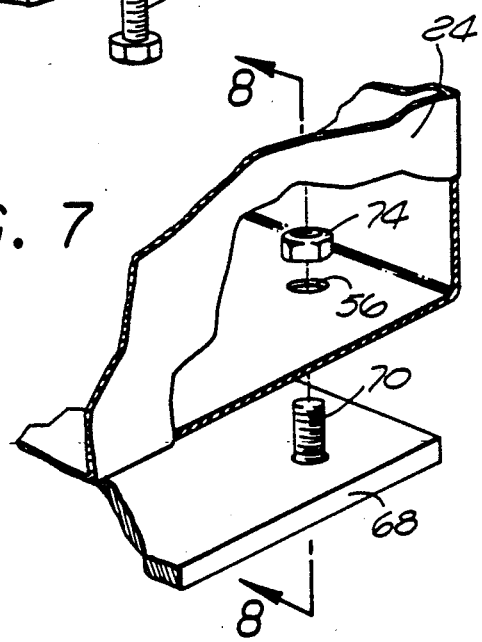
FIG. 7 is an enlarged, fragmented view, partly in cut-away section, taken generally along the arrow 7 in FIG. 6, showing the manner in which an impulse module is attached to the adapter plate using upwardly extending bolts welded to the adapter plate.
Figure 8:
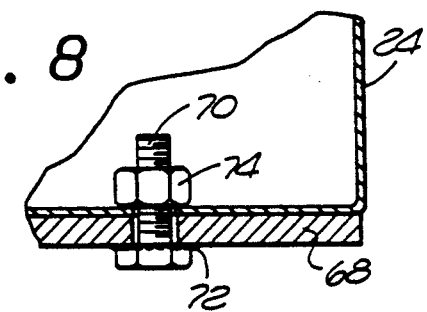
FIG. 8 is an enlarged, fragmented cross sectional view taken generally along line 8-8 of FIG. 7, further illustrating attachment of the impulse module to the adapter plate.

With reference now to FIGS. 7 and 8, the adapter plate 68 has a plurality of bolts 70 extending upwardly therethrough to provide means for attaching impulse modules 24 to the adapter plate. These bolts 70 are pre-welded to the adapter plate 68 along a weld line 72 where the head of the bolt 70 abuts the underside of the adapter plate. The impulse modules 24 are bolted to the adapter plate 68 by aligning the bolts 70 within the apertures 56 in the impulse modules 24, and threading a nut 74 thereon.

Although only a single impulse module could be bolted thereto, an adapter plate 68 is preferably used when more than one impulse module 24 is to be supported on the pedestal 36. Moreover, adapter plates 68 of different dimensions are provided to accommodate varying numbers of impulse modules. This feature advantageously allows the manufacturer to change the number of impulse modules 24 which can be displayed by changing the adapter plate. In the accompanying drawings, two interchangeable adapter plates 68 are provided. The first adapter plate 68 is sized to accommodate two impulse modules 24. The second adapter plate 68 (shown in FIG. 6) is sized to support three impulse modules 24.

It should be noted that the bolts 70 welded to the adapter plate 68 are used to attach all but one of the impulse modules 24 to the adapter plate. The impulse module 24 which is not attached using upwardly extending bolts 70, is bolted to both the adapter plate 68 and the pedestal 36 using downwardly extending bolts 55 in a similar manner to that shown in FIG. 3, with the difference being that the bolts 55 pass through apertures 76 (FIG. 6) in the adapter plate 68 prior to passing through the apertures 60 of the pedestal and having nuts 52 threaded thereon. In a three module arrangement (FIG. 8), the middle impulse module 24, which is preferably the computer weight scale module, is bolted to the pedestal 36 in this fashion.

The weight scale impulse module 24 is situated on the adapter plate 68 at a location in alignment with the pedestal 36 so that the electrical cable 38 can be easily connected by passing the plug 40 through an opening 78 in the adapter plate 68. The opening 78 on the adapter plate 68 is aligned with the socket 42 when the impulse module 24 is installed on the adapter plate. The opening 78 also aligns with an opening 80 in the top of the pedestal. The access opening 66 in the rear of the pedestal 36 enables one to pass the cable 38 up through the opening 78 so that the plug 40 can be connected to the socket 42 prior to bolting the impulse module 24 in place.

Once the impulse modules 24 and adapter plate 68 have been bolted to the pedestal 36, construction of the multi-module impulse machine 20 is complete. However, because the impulse modules 24 are removably attached to the adapter plate 68, the modular construction system beneficially allows a subsequent change in the number or type of impulse modules 24 which are utilized along with the computer weight scale impulse module. One desiring to expand the appeal of the impulse machine 20 by adding one or more additional impulse modules 24 thereto, need only to unbolt the adapter plate 68 and substitute a larger adapter plate therefor. When one desires to only substitute new impulse modules 24 for older models that have broken or lost their appeal, it is only necessary to detach the adapter plate 68 from the pedestal 36.

From the foregoing, it will be appreciated that the modular construction system of the present invention advantageously provides for construction of a versatile impulse machine 20 that can be reconfigured in a relatively easy fashion to utilize different numbers or types of impulse modules 24. This advantageously permits one to replace outdated or broken impulse modules or to expand an impulse machine by adding modules. Moreover, the present invention enables a weight scale impulse module, which is responsive to a floor scale, to be combined with one or more impulse modules of a different theme. Thus, the overall volume of vending business generated by an impulse machine vending unit is increased due to the inclusion of a plurality of different entertaining or informative impulse modules, which increase the likelihood that at least one of the impulse attractions on display will appeal to a potential consumer.

While several particular forms of the invention have been illustrated and described, it will also be apparent that various modifications can be made without departing from the spirit and scope of the invention. Accordingly, it is not intended that the invention be limited, except as by the appended claims.

I claim:

1. A method for constructing an impulse machine, the steps comprising:
   providing a base plate;
   attaching pedestal means atop the base plate;
   attaching a first adapter plate atop the pedestal means in a removable manner; and
   attaching a first group of impulse modules to the first adapter plate in a removable manner.

2. A method as set forth in claim 1, further including the steps of detaching the first adapter plate and the first group of impulse modules from the pedestal means, providing a second adapter plate atop the pedestal means, the second adapter plate being sized to accommodate a second group of impulse modules, the second group of impulse modules including a different number of impulse modules than the first group, attaching the second group of impulse modules to the second adapter plate, and attaching the second adapter plate atop the pedestal means in a removable manner.

3. A method for constructing a novelty impulse machine, the steps comprising:
   providing a floor weight scale assembly including a base plate and sensing means;
   attaching cabinet means to the base plate assembly;
   providing a first adapter plate atop the cabinet means;
   situating a first group of impulse modules atop the first adapter plate;
   attaching the impulse modules and the first adapter plate to the cabinet means in a removable manner; and
   providing electrical means for allowing at least one impulse module to be responsive to the load sensing means.

4. A method as set forth in claim 3, further including the steps of detaching the first adapter plate and the first group of impulse modules from the cabinet means, providing a second adapter plate atop the cabinet means, the second adapter plate being sized to accommodate a second group of impulse modules, the second group of impulse modules including a different number of impulse modules than the first group, situating the second group of impulse modules atop the second adapter plate, and attaching the second group of impulse modules and the second adapter plate to the cabinet means in a removable manner.

5. A method as set forth in claim 3, further including the step of removing the first adapter plate and the first group of impulse modules and attaching a single impulse module atop the cabinet means.

6. A method as set forth in claim 3, wherein the step of attaching the cabinet means to the base plate includes bolting the base plate to the cabinet means utilizing nuts which have been welded to an inside flange of the cabinet means.

7. A method as set forth in claim 3, wherein the step of situating the first group of impulse modules atop the first adapter plate includes fixing the impulse modules onto upwardly extending bolts welded to the first adapter plate.

8. A method for constructing an impulse machine as set forth in claim 3, wherein the load sensing means comprises a pressure pad and at least one load cell.

9. A method as set forth in claim 3, wherein the step of attaching the impulse modules and the first adapter plate to the cabinet means includes bolting the impulse modules to the adapter plate and bolting the adapter plate to the cabinet means.

10. A novelty impulse machine, comprising:
a base plate assembly;
cabinet means having a bottom end and a top end, the bottom end being attached to the base plate assembly and the top end having a first adapter plate removably attached thereto by connecting means; and
a plurality of impulse modules removably attached to the adapter plate.

11. A novelty impulse machine as set forth in claim 10, wherein the first adapter plate includes upwardly extending bolts welded thereto, and wherein the impulse modules are removably attached to the first adapter plate by the bolts.

12. A novelty impulse machine as set forth in claim 10, including a second adapter plate which is interchangeable with the first adapter plate, the second adapter plate being sized to accommodate a different number of impulse modules than the first adapter plate, wherein the number of impulse modules which can be utilized in the impulse machine is changeable by interchanging the first and second adapter plates.

13. A novelty impulse machine as set forth in claim 12, wherein one of the adapter plates is sized to accommodate three impulse modules.

14. A novelty impulse machine as set forth in claim 13, wherein the base plate assembly includes load sensing means and wherein the system further includes electrical means for allowing at least one impulse module to be responsive to the load sensing means.

15. A novelty impulse machine as set forth in claim 14, wherein the electrical means includes wiring connected to the load sensing means at one end and to at least one impulse module at the opposite end, wherein the first and second adapter plates each include an aperture through which the wiring can pass.

16. A novelty impulse machine as set forth in claim 15, wherein the load sensing means comprises a floor scale having a pressure pad and at least one load cell.

17. A novelty impulse machine as set forth in claim 10, wherein the cabinet means includes an opening for providing access to the attachment means.

18. A novelty impulse machine as set forth in claim 10, wherein the bottom end of the cabinet means includes an inside flange having a plurality of apertures therethrough and a plurality of nuts welded atop the inside flange in alignment with the apertures, wherein the cabinet means is bolted to the base plate assembly by a plurality of bolts extending through the base plate assembly and into threaded engagement with the nuts.

* * * * *